(12) United States Patent
Matsuoka

(10) Patent No.: US 7,691,518 B2
(45) Date of Patent: Apr. 6, 2010

(54) PREVENTION OF FLOODING OF FUEL CELL STACK

(75) Inventor: Naoya Matsuoka, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1184 days.

(21) Appl. No.: 10/555,924

(22) PCT Filed: May 12, 2004

(86) PCT No.: PCT/JP2004/006679

§ 371 (c)(1),
(2), (4) Date: Nov. 8, 2005

(87) PCT Pub. No.: WO2004/102708

PCT Pub. Date: Nov. 25, 2004

(65) Prior Publication Data

US 2006/0222924 A1 Oct. 5, 2006

(30) Foreign Application Priority Data

May 15, 2003 (JP) ............................ 2003-136791

(51) Int. Cl.
*H01M 8/04* (2006.01)
*H01M 8/10* (2006.01)
*H01M 8/24* (2006.01)

(52) U.S. Cl. .................... 429/38; 429/22; 429/24; 429/25; 429/32

(58) Field of Classification Search .................. 429/22, 429/23, 24, 30, 33, 38, 39, 32
See application file for complete search history.

(56) References Cited

U.S. PATENT DOCUMENTS 4,664,987 A * 5/1987 Isenberg .................. 429/32 X (Continued)

FOREIGN PATENT DOCUMENTS

EP 0 716 463 A2 6/1996

(Continued)

OTHER PUBLICATIONS

D.P. Wilkinson, et al., "Water management and stack design for solid polymer fuel cells," Journal of Power Sources, Apr. 1, 1994, pp. 117-127, vol. 49, No. 1/3, Elsevier Sequoia, Lausanne, CH.

(Continued)

*Primary Examiner*—Stephen J. Kalafut
(74) *Attorney, Agent, or Firm*—McDermott Will & Emery LLP

(57) ABSTRACT

A fuel cell stack (1) generates power by an electrochemical reaction between hydrogen and oxygen in plural stacked fuel cells (2a, 2b). Each fuel cell (2a, 2b) comprises an anode (26a) to which hydrogen is supplied, a cathode (26b) to which air containing oxygen is supplied, and a electrolyte membrane (20) which conducts hydrogen ions from the anode (26a) to the cathode (26b). The fuel cells (2a, 2b) comprise center cells (2a) and end cells (2b). By arranging the moisture absorption capacity of the end cells (2b) to be larger than that of the center cells (2a), flooding in the end cells (2b) which do not easily rise in temperature is prevented, and the low-temperature start-up performance of the fuel cell stack (1) is enhanced.

33 Claims, 8 Drawing Sheets

U.S. PATENT DOCUMENTS

| | | | | |
|---|---|---|---|---|
| 5,252,410 | A | * | 10/1993 | Wilkinson et al. ......... 429/32 X |
| 5,846,668 | A | * | 12/1998 | Watanabe .................... 429/32 |
| 6,322,918 | B1 | | 11/2001 | Kelley et al. |
| 6,838,205 | B2 | * | 1/2005 | Cisar et al. ................ 429/32 X |
| 2003/0082433 | A1 | | 5/2003 | Sano et al. |

FOREIGN PATENT DOCUMENTS

| | | |
|---|---|---|
| EP | 1 450 432 A2 | 8/2004 |
| JP | 2002-184449 A | 6/2002 |
| JP | 2002-208421 A | 7/2002 |
| WO | WO 99/28985 | 6/1999 |

OTHER PUBLICATIONS

Thomas A. Zawodzinski, Jr., et al., "A Comparative Study of Water Uptake By and Transport Through Ionomeric Fuel Cell Membranes," Journal of the Electrochemical Society, Jul. 1993, pp. 1981-1985, vol. 140, No. 7, The Electrochemical Society, Inc.

* cited by examiner

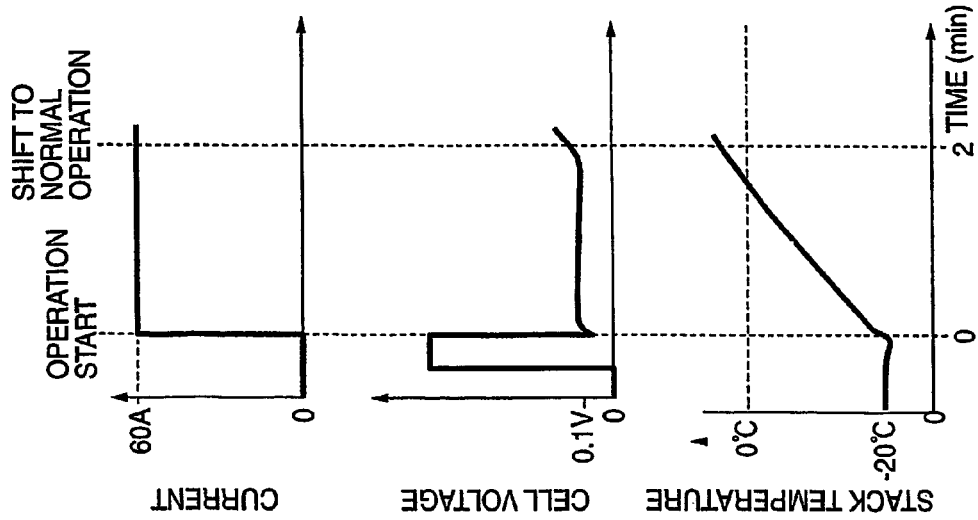
FIG. 5D
FIG. 5E
FIG. 5F
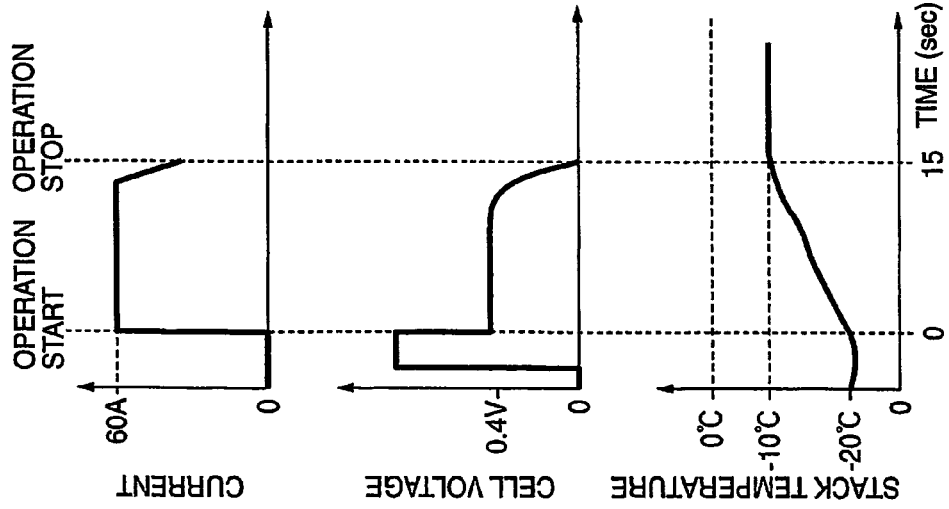
FIG. 5A PRIOR ART
FIG. 5B PRIOR ART
FIG. 5C PRIOR ART

PREVENTION OF FLOODING OF FUEL CELL STACK

RELATED APPLICATION

This application is the U.S. National Phase under 35 U.S.C. § 371 of International Application No. PCT/JP2004/006679, filed on May 12, 2004, which in turn claims the benefit of Japanese Application No. 2003-136791, filed on May 15, 2003, the disclosure of which Applications are incorporated by reference herein.

FIELD OF THE INVENTION

This invention relates to prevention of flooding of a fuel cell stack.

BACKGROUND OF THE INVENTION

In a fuel cell stack which is a stack of polymer electrolyte fuel cells (PEFC), hydrogen gas supplied to an anode is ionized, conducts on a polymer electrolyte membrane to reach a cathode as proton, and reacts with oxygen supplied to the cathode and electrons to form water. Among the reaction enthalpies between hydrogen and oxygen, energy which is not used for generating power is converted into heat.

JP2002-208421A published by the Japanese Patent Office in 2002, discloses prevention of the moisture generated in the fuel cells from freezing by evacuating the fuel cells using dry gas or low humidity gas when the fuel cell stack stops operation at low temperature. This freeze prevention is particularly needed in a fuel cell stack for vehicles in which running conditions change sharply.

SUMMARY OF THE INVENTION

When a fuel cell stack which has stopped starts again, when warmup is performed by the heat produced by the power generation reaction, moisture is produced in the fuel cell stack again. Although this produced moisture is absorbed by the electrolyte membrane or diffuses to the anode via the electrolyte membrane, if the moisture amount exceeds the moisture absorption capacity of the electrolyte membrane, moisture will overflow to the cathode. This phenomenon is called flooding.

When the temperature during startup of the fuel cell stack is very low, the moisture which overflowed to the cathode freezes despite heat generation due to the power generation reaction of the fuel cell. The frozen moisture covers the cathode surface, prevents cathode gas from reaching the cathode, and interferes with the power generation reaction. Therefore, it may be difficult to start the fuel cell stack even if moisture had previously been removed by the prior art technique.

In a fuel cell stack which is starting up, the cells at the ends tend to be more difficult to warm up than cells in a center position. This is because heat tends to escape from the ends where there is a large contact area with the open air. Therefore, when starting the fuel cell stack below freezing point, the time until the ends of the fuel cell rise above freezing point is longer than the time until the center position rises above freezing point. As a result, the possibility that flooding will occur below freezing point is larger at the ends than in cells in a center position.

It is therefore an object of this invention to prevent flooding during startup by taking the startup characteristics of the fuel cell stack into consideration.

In order to achieve the above object, this invention provides a fuel cell system comprising a fuel cell stack comprising a plurality of fuel cells stacked in series. The fuel cells comprise a first fuel cell disposed in a center position of the fuel cell stack with respect to a stacking direction of the fuel cells, and a second fuel cell disposed in a position other than the center position. The second fuel cell is arranged to have a larger moisture absorption capacity than the first fuel cell.

This invention also provides a fuel cell stack generating electric power through electrochemical reaction of hydrogen and oxygen. The fuel cell stack comprises a plurality of fuel cells stacked in series. Each of the fuel cells comprises an anode to which hydrogen is supplied, a cathode to which air containing oxygen is supplied and an electrolyte membrane which conducts hydrogen ions from the anode to the cathode. The fuel cells comprise a first cell disposed in a center position of the fuel cell stack with respect to a stacking direction of the fuel cells, and a second cell disposed in a position other than the center position. The second cell is arranged to have a larger moisture absorption capacity than the first cell.

This invention also provides a fuel cell stack which generates power by an electrochemical reaction between hydrogen and oxygen. The fuel cell stack comprises a plurality of fuel cells stacked in series. Each of the fuel cells comprises an electrode and a gas passage facing the electrode. The fuel cells comprise a first cell disposed in a center position of the fuel cell stack in the stacking direction of the fuel cells, and a second cell disposed in a position other than the first cell, and the gas passage of the second cell has a larger cross-sectional area than the gas passage of the first cell.

The details as well as other features and advantages of this invention are set forth in the remainder of the specification and are shown in the accompanying drawings.

BRIEF DESCRIPTION OF THE DRAWINGS

FIGS. 5A-5F are timing charts describing a variation of the output voltage and output current of a fuel cell, and the temperature of a fuel cell stack, during startup of the fuel cell system.

DESCRIPTION OF THE PREFERRED EMBODIMENTS

Figure 1:
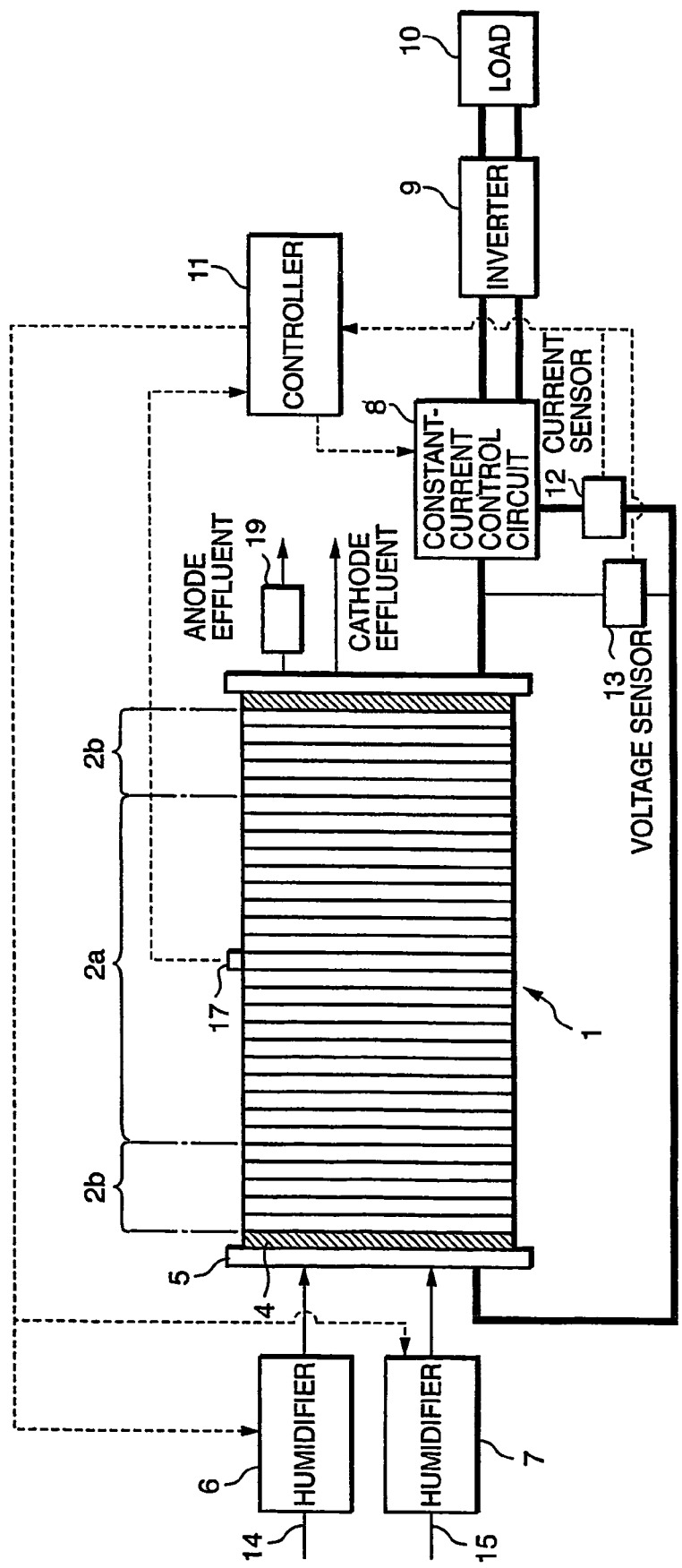
FIG. 1 is a schematic diagram of a fuel cell system according to this invention.

Referring to FIG. 1 of the drawings, a fuel cell system for a vehicle according to this invention comprises a fuel cell stack 1, hydrogen supply passage 14, air supply passage 15, humidifiers 6, 7 and a combustor 19. The fuel cell stack 1 is electrically connected to an electrical load 10 via a constant current control circuit 8 and an inverter 9. The inverter 9 converts direct current output by a constant current control circuit 8 into alternating current, and supplies it to the electrical load 10.

Hydrogen stored in a hydrogen tank or reformed by a reformer is supplied to the hydrogen supply passage 14. The humidifier 6 humidifies the hydrogen in the hydrogen supply passage 14. Air from a pump or a compressor is supplied to the air supply passage 15. The humidifier 7 humidifies air in the air supply passage 15.

The humidifiers 6, 7 have the function of humidifying the circulating gas to a desired humidity including a relative humidity of zero percent. A bubbler or a steamer can be used as the humidifiers 6 and 7.

The fuel cell stack 1 comprises thirty fuel cells stacked in series. Among the thirty fuel cells, cells 2a situated in a center position in the stacking direction are provided with the usual membrane electrode assembly (MEA) 3. End cells 2b situated on both sides of the center cells 2a in the stacking direction are provided with an MEA 3 of higher moisture absorption capacity than that of the center cells 2a.

Herein, twenty fuel cells situated in the center in the stacking direction form the center cells 2a, and five fuel cells respectively situated on both sides form the end cells 2b. The center cells 2a correspond to the first cell in the claims, and the end cells 2b correspond to the second cell in the claims.

Each end of the fuel cell stack 1 is in contact with a stainless steel end plate 5 via a heat insulating layer 4. The fuel cell stack 1 is tightened in the stacking direction by a long screw which passes through the fuel cells 2a, 2b, the heat insulating layer 4 and the end plates 5. The heat insulating layer 4 comprises an electrically conducting plate member having numerous holes with air sealed inside them.

Figure 2:
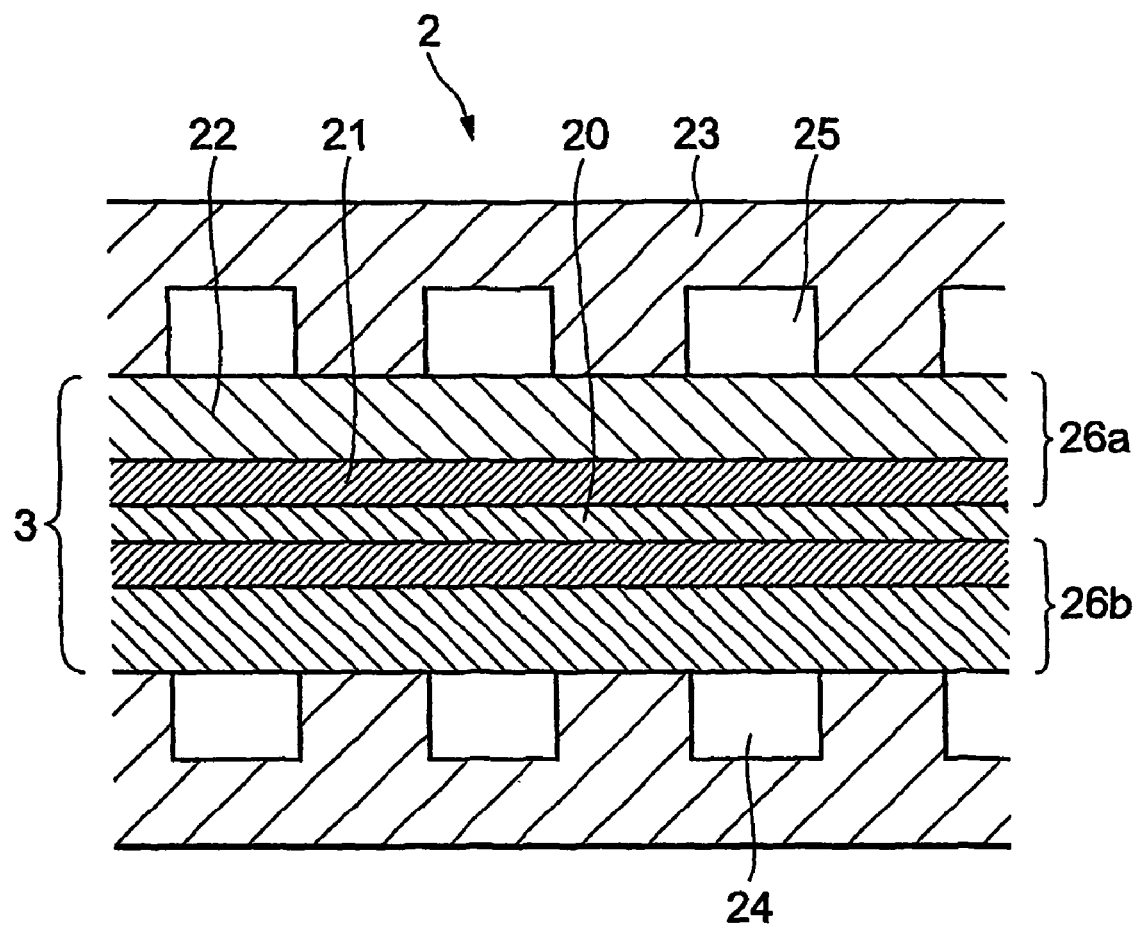
FIG. 2 is a schematic diagram of a unit cell according to this invention.

Referring to FIG. 2, each fuel cell 2a (2b) comprises the MEA 3, and a pair of separators 23 formed of electrically conducting plate members which are made of carbon graphite. It is also possible to construct the separators 23 with the electrically conducting plate members which are used for the heat insulation part 4.

The MEA 3 comprises a solid electrolyte membrane 20 and electrodes 26a, 26b formed on both sides. The electrodes 26a, 26b comprise a catalytic layer 21 comprising a platinum (Pt) catalyst supported on carbon black, and a gas diffusion layer 22 comprising carbon paper. Herein, the electrode 26a is the anode and the electrode 26b is the cathode.

In order to increase the moisture absorption capacity, the thickness of the membrane 20 of the end cells 2b is made larger than the thickness of the membrane 20 of the center cells 2a. Likewise, the layer thickness of the electrodes 26a, 26b of the end cells 2b is made larger than the layer thickness of the electrodes 26a, 26b of the center cells 2a. This is materialized by making the thickness of the catalyst layers 21 of the end cells 2b lager than those of the center cells 2a, or making the thickness of the 22 gas diffusion layers 22 of the end cells 2b lager than those of the center cells 2a.

The electrode 26 is formed by mixing a platinum catalyst with Nafion® (® denotes a Registered Trademark) and pure water, stirring, and applying to carbon paper. The electrode 26 is formed in one piece with the solid electrolyte membrane 20 by applying a hot press to the solid electrolyte membrane 20 at a temperature of about 120 degrees Centigrade under a pressure of about 100 kilogram per square centimeter (kg/$cm^2$) for one minute. The MEA 3 comprises the electrodes 26 formed in one piece with both sides of the solid electrolyte membrane 20 in this way. The electrode area of the MEA is 300 square centimeters ($cm^2$).

A passage 24 which circulates hydrogen is formed in the separator 23 which is in contact with the anode 26a. A passage 25 which circulates air is formed in the separator 23 which is in contact with the cathode 26b. Hydrogen humidified by the humidifier 6 from the hydrogen supply passage 14 is supplied to the passage 24. Air humidified by the humidifier 7 from the air supply passage 15 is supplied to the passage 25. The fuel cells 2a, 2b generate electricity by an electrochemical reaction between hydrogen supplied to the anode 26a and oxygen in the air supplied to the cathode 26b, via the solid electrolyte membrane 20. The gas after the reaction at the anode 26a is discharged as anode effluent. After burning the anode effluent with the combustor 19, it is discharged into the atmosphere. The gas after the reaction at the cathode 26b is discharged into the atmosphere as cathode effluent.

Next, the method of calculating the moisture absorption capacity of the end cells 2b will be described.

First, the calorific capacity of the fuel cell is calculated.

For the solid electrolyte membrane 20, NAFION 111 (Dupont®) made from perfluorocarbon sulfonic acid is used. The specification of NAFION 111 is membrane thickness 30 microns (μm), specific heat 0.86 Joules per gram-absolute temperature (J/g-K) and density 1.8 grams/cubic centimeter (g/$cm^3$).

For the gas diffusion layer 22, carbon paper of thickness 300 μm, specific heat 0.86 J/g-K and density 0.2 g/$cm^3$ is used. The carbon paper has numerous pores and has the function of absorbing moisture in the pores.

As the separator 23, carbon graphite of thickness 4 millimeters (mm), specific heat 0.75 J/g-K and density 1.75 g/$cm^3$ is used.

The calorific capacity of the solid electrolyte membrane 20 is 0.0046 Joules/absolute temperature-square centimeter (J/K-$cm^2$), the calorific capacity of the gas diffusion layer 22 is 0.005 J/K-$cm^2$ and the calorific capacity of the separator 23 is 0.53 J/K-$cm^2$. The calorific capacity of the gas diffusion layer 22 is effectively the calorific capacity of the electrodes 26a, 26b. The calorific capacity of one fuel cell which comprises the solid electrolyte membrane 20, the two electrodes 26a, 26b and the two separators 23 is about 1.1 J/K-$cm^2$.

As is clear from the above calculation, most of the calorific capacity is due to the calorific capacity of the separator 23, and it is almost unaffected by the composition and thickness of the solid electrolyte membrane 20, or the thickness of the electrodes 26a, 26b.

According to calculation, in the fuel cell stack using this fuel cell, the thermal power required to increase the stack temperature from minus 20 degrees Centigrade to 0 degrees Centigrade is about 22 J/$cm^2$ per fuel cell. During power generation, in addition to the heat generation by the cell itself, heat is transmitted to the center cells 2a of the fuel cell stack also from surrounding cells. On the other hand, in the cells 2b at the ends of the fuel cell stack 1, as the heat transmitted from the center cells 2a and the heat emitted from the ends cancel each other out, a temperature rise due to heat propagation cannot be expected, and the temperature increases due only to the heat generated by the end cells 2b themselves.

If the end cells 2b generate electrical power with a current density of 0.2 A/cm$^2$ at −20 degrees Centigrade, the heat generation amount due to the power generation reaction will be about 0.2 W/cm$^2$. Herein, current density means the current per square centimeter of the MEA 3.

In this condition, it takes the temperature of the end cells 2b about 2 minutes to rise to 0 degrees Centigrade. Due to the power generation reaction in this interval, about 2 milligrams per square centimeter (mg/cm$^2$) of moisture is produced.

Hence, regarding the end cells 2b, the MEA 3 is designed so that the MEA 3 can absorb all the moisture produced from when the temperature is −20 degrees Centigrade to when it reaches 0 degrees Centigrade. In this way, flooding in the end cells 2b below freezing point can be prevented. Some of the moisture produced by the cathode 26b evaporates from the solid electrolyte membrane 20 into the anode 26a by a back diffusion phenomenon, and this evaporation amount is not taken into consideration. However, if the amount of evaporation into the anode 6a can be determined, it can be taken into account in the calculation of the moisture absorption capacity of the end cells 2b. The above calculation is an example, and there will be a different value depending on the composition of the MEA 3, or assumptions concerning the heat balance.

Next, it will be described how to make the moisture absorption capacity of the MEA 3 of the end cells 2b larger than the MEA 3 of the center cells 2a.

For all the fuel cells of the fuel cell stack 1, it is also possible to vary the moisture absorption capacity from the center gradually toward both ends.

However, this setup complicates the design, assembly and manufacture of the fuel cell stack 1. Moreover, increasing the moisture absorption capacity of all cells may reduce the power generation efficiency of the fuel cell stack 1 in the steady state.

In this embodiment, the center cells 2a have the usual moisture absorption capacity, and the end cells 2b have a larger moisture absorption capacity.

As mentioned above, there are five of the end cells 2b at each end, although this number can be varied. The moisture absorption capacity is equal to the weight change of the MEA 3 when the MEA 3 is dried from the state where the MEA 3 is humidified using humidifying gas having a humidity of 100%.

(1) Thickness of Solid Electrolyte Membrane 20

The solid electrolyte membrane 20 using NAFION 111 perfluorosulfonic acid polymer having a film thickness of 30 μm can absorb 0.35 mg/cm$^2$ of moisture. The solid electrolyte membrane 20 using NAFION 117 of film thickness 175 μm can absorb 2.1 mg/cm$^2$ of moisture. Hence, firstly for the end cells 2b, the film thickness of the solid electrolyte membrane 20 is made larger than that for the center cells 2a. For example, the moisture absorption capacity of the cells 2b can be made larger than the moisture absorption capacity of the cells 2a by using NAFION 111 for the cells 2a, and using NAFION 117 for the cells 2b.

According to "Characterization of Polymer Electrolytes for Fuel Cells" by T. Zawodzinski et al. (J. Electrochem. Soc. 140 (1993) pp1981), when a solid electrolyte membrane is dried to some extent, the moisture content is 2, and when it has absorbed moisture to the maximum extent, the moisture content is about 6.

Apart from the moisture absorption capacity, as for the thickness of the solid electrolyte membrane 20, it preferably has a thickness of 5 μm or more from the viewpoint of making it impermeable to gas.

(2) Layer Thickness and Specific Surface Area of Electrodes 26a, 26b

If Vulcan carbon black having a specific surface area of 100 m$^2$/g is used for the carbon material of the catalyst layer 21 or gas diffusion layer 22, 0.1 mg/cm$^2$ of moisture can be adsorbed by a thickness of 5 μm. If the thickness of the electrode is 50 μm, 1 mg/cm$^2$ of moisture can be adsorbed.

If Ketjen black of specific surface area 1000 m$^2$/g is used as the carbon material of the catalyst layer 21 or gas diffusion layer 22, 2 mg/cm$^2$ of moisture can be adsorbed by a thickness of 10 μm.

Hence, by making the layer thickness of the electrodes of the cell 2b larger than those of the cell 2a, the moisture absorption capacity of the cell 2b can be made larger than the moisture absorption capacity of the cell 2a. Alternatively, the same result can be obtained by making the specific surface area of the electrodes of the cell 2b larger than that of the cell 2a.

The layer thickness of an electrode is proportional to the carbon amount used, and in order to support a sufficient amount of the platinum (Pt) catalyst, it is preferably a thickness of 5 μm or more.

(3) Ion Exchange Group Equivalent Weight EW

By using DOWEX perfluorosulfonic acid polymer having an EW of 800 instead of the NAFION® film having an ion exchange group equivalent weight EW for the solid electrolyte membrane 20, approximately 1.5 times the amount of moisture can be absorbed. If the ion exchange group equivalent weight EW is small, the number of moles of ion exchange groups increases, so the moisture absorption capacity is enhanced. If the thickness of the solid electrolyte membrane 20 is 30 μm, the DOWEX® film can absorb 0.53 mg/cm$^2$ of moisture. This is approximately 0.18 mg/cm$^2$ more than a film of NAFION 112 of identical thickness. However, if the ion exchange group equivalent weight EW becomes small, the film strength decreases. In order to maintain a desirable film strength, the iron exchange group equivalent weight EW is preferably 200 or more.

(4) Admixture of Absorbing Material

The moisture absorbing capacity of the MEA 3 can be increased by mixing an absorbing material in the solid electrolyte membrane 20, catalyst layer 21 or the carbon layer which does not support platinum (Pt) provided adjacent to the catalyst layer 21. One example of such an absorbing material is silica gel. If the silica gel content is 10%, approximately 2 mg/cm$^2$ of moisture can be absorbed by a film having a thickness of 175 micrometers. The effect of mixing the absorbing material can be calculated from isothermal adsorption curves.

U.S. Pat. No. 5,523,181 discloses a relation between the silica gel content and the moisture absorbing capacity of a solid electrolyte membrane.

The absorbing material may be a hygroscopic inorganic porous particle moisture-absorbing resin selected from a group comprising silica gel, synthetic zeolite, alumina gel, titania gel, zirconia gel, yttria gel, tin oxide and tungsten oxide. Alternatively, any of a crosslinked polyacrylate, starch-acrylate graft copolymer cross-linked material, Poval polymer resin, polyacrylonitrile polymer resin or carboxymethyl cellulose polymer resin is used. By using any of these, the moisture absorbing capacity can be increased without causing a deterioration of the MEA 3.

Herein, the moisture-absorbing material is mixed with the solid polymer electrolyte 20 only in the end cells 2b. If on the other hand the moisture-absorbing material is mixed with the solid electrolyte membrane 20 of both the end cells 2b and center cells 2a, the moisture-absorbing material admixture rate of the cells 2b can be arranged to be higher than the moisture-absorbing material admixture rate of the cells 2a. The moisture-absorbing material is preferably arranged to lie within a range of 0.01 wt%-30 wt% relative to the polymer electrolyte which is the main ingredient of the solid electrolyte membrane 20. If it is less than 0.01%, the mixing of the absorbing material cannot be expected to have any effect, and if it exceeds 30%, the proton electrical conduction rate of the solid electrolyte membrane 20 considerably decreases.

(5) Polymer Liquid Capacity During Manufacture of the MEA 3

When the MEA 3 contains approximately 0.5 $mg/cm^2$ of NAFION®, it can absorb 0.02 $mg/cm^2$ of moisture. This can be implemented by coating a catalyst containing NAFION® to the catalyst layer 21. If a NAFION® solution is also coated on the gas diffusion layer 22, the MEA 3 can hold approximately 50 $gm/cm^2$ of NAFION®, and can therefore absorb 2 $mg/cm^2$ of moisture. Hence, the polymer solution having a perfluorocarbon sulfonic acid as its main starting material has moisture-absorbing ability.

By arranging that the end cells 2b contain more of the polymer solution than the center cells 2a, the moisture absorption capacity of the end cells 2b can be made larger than the moisture absorption capacity of the center cells 2a.

The polymer weight required to form a three-phase interface in the catalyst layer 21 is 0.1 $mg/cm^2$, and the usage amount of the polymer solution is preferably determined to satisfy this requirement.

By using one or plural methods selected from the aforesaid (1)-(5), the moisture absorption capacity of the MEA 3 of the end cells 2b can be made larger than the moisture absorption capacity of the MEA 3 of the center cells 2a. Among the aforesaid methods (1)–(5), the method used to increase the moisture absorption capacity of the gas diffusion layer 22 or catalyst layer 21 may be applied to the gas diffusion layer 22 and catalyst layer 21 of both the anode 26a and cathode 26b, or may be applied to the gas diffusion layer 22 or catalyst layer 21 of only the cathode 26b. Since it is the cathode 26b which produces moisture by the electrochemical reaction, there is a tendency for flooding to occur at the cathode 26b more than at the anode 26a.

The setting of the moisture-absorbing amount is not limited to these two types, and more settings are possible. As described above, for all the fuel cells in the fuel cell stack 1, the moisture absorption capacity may also be gradually varied from the center to the two ends.

According to this embodiment, by applying one or more of the aforesaid methods, the moisture absorption capacity of the end cell 2b is set to be larger than the moisture absorption capacity of the center cell 2a.

Next, the control of the humidifiers 6, 7 which affect the moisture content of the fuel cell stack 1, and the constant current control circuit 8 which adjusts the output current of the fuel cell stack 1 and therefore varies the heat generation amount in the fuel cells 1, will be described.

To control these units, the fuel cell system comprises a controller 11. The controller 11 respectively controls the humidification state of the hydrogen and air supplied to the fuel cell stack 1 by signals output to the humidifiers 6, 7. The controller 11 also controls the output current of the fuel cell stack 1 by outputting a signal to the constant current control circuit 8.

The controller 11 comprises a microcomputer comprising a central processing unit (CPU), read-only memory (ROM), random access memory (RAM) and input/output interface (I/O interface). The controller may also comprise plural microcomputers.

In order for the controller 11 to control the humidifiers 6, 7 and the output current of the fuel cell stack 1, detection data are input as signals to the controller 11 respectively from a temperature sensor 17 which detects the temperature of the center cells 2a, a current sensor 12 which detects the output current of the fuel cell stack 1, and a voltage sensor 13 which detects the output voltage of the fuel cell stack 1.

Next, the routine for stopping the fuel cell system executed by the controller 11 will be described. The controller 11 executes this routine when an operation stop command is input to the input interface.

Figure 3:
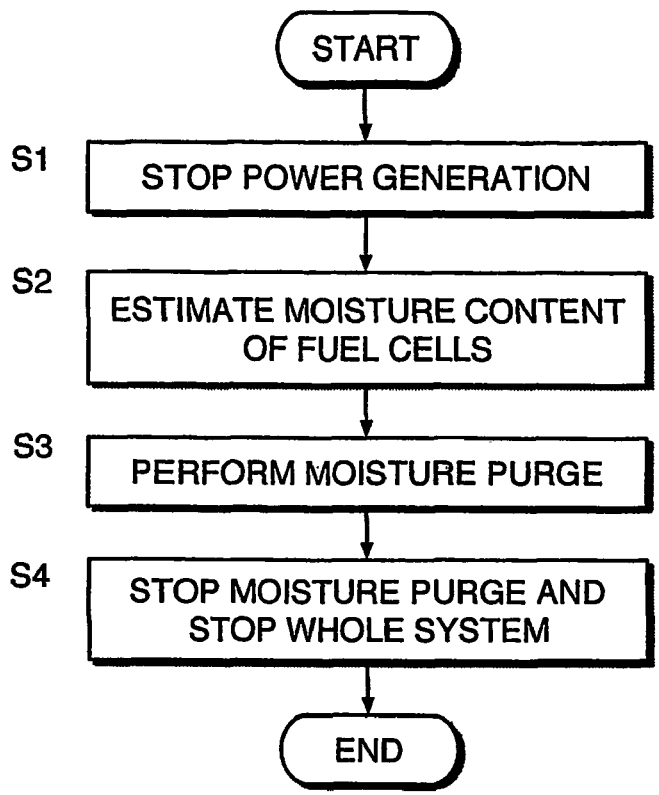
FIG. 3 is a flow chart describing a routine for stopping the fuel cell system performed by a controller according to this invention.

Referring to FIG. 3, first in a step S1, the controller 11 stops power generation of the fuel cell stack 1 by issuing a command to the constant current control circuit 8 which sets the output current to zero.

In a following step S2, the controller 11 estimates the moisture content of the fuel cells 2a, 2b. This estimation is performed based on the detection values of the current sensor 12 and voltage sensor 13 immediately prior to stopping power generation by the fuel cell stack 1. Specifically, the larger is the output current of the fuel cell stack 1, the more vigorous is the electrochemical reaction of the fuel cells 2a, 2b and the larger is the moisture amount produced, so it is considered that the moisture content of the solid electrolyte membrane 20 of the fuel cells 2a, 2b is then larger. In other words, it is considered that the larger is the power output of the fuel cell stack 1, the larger is the moisture content of the solid electrolyte membrane 20 of the fuel cells 2a, 2b.

A humidity sensor may of course also be installed in the fuel cell stack 1, and the moisture content of the solid electrolyte membrane 20 of the fuel cells 2a, 2b may be determined based on the humidity detected by the humidity sensor. A 1 kHz high frequency impedance meter which measures the membrane resistance of the MEA 3, and a thermocouple which measures temperature, may also be installed in one of the fuel cells 2a, 2b, and the moisture content of the fuel cell stack 1 may be estimated from the membrane resistance and temperature.

In a next step S3, the controller 11 performs drying of the fuel cells 2a, 2b. Specifically, humidification by the humidifiers 6, 7 is first stopped, and hydrogen from the hydrogen supply passage 14 and air from the air supply passage 15 are supplied to the fuel cell stack 1 to purge internal moisture. Although hydrogen and air are supplied to the fuel cells 2a, 2b, the output current is suppressed to zero by the constant current control circuit 8, so the fuel cells 2a, 2b do not perform an electrochemical reaction. The hydrogen and air supply time is arranged to be longer, the larger is the moisture content estimated in the step S2. Instead of completely stopping the humidifiers 6, 7, the moisture in the fuel cells 2a, 2b may be purged using low humidity hydrogen and air as a low humidification state.

Part of the moisture impregnated in the solid electrolyte membrane 20 is purged by the dried or low humidity hydrogen supplied to the anode 26a, flows into the combustor 19 together with the hydrogen, and is processed by the combustor 19. Alternatively, part of the moisture impregnated in the solid electrolyte membrane 20 is discharged to the atmosphere together with air purged by the dried or low humidity air supplied to the cathode 26*b*.

The purge duration time is set based on the following condition. Specifically, the purge duration time must be such that the moisture content allows power generation even for startup below freezing point, and such that the moisture amount produced until the temperature of the fuel cells 2*a*, 2*b* rises above freezing point due to the electrochemical reaction on startup, remains within a range in which flooding does not occur.

When the purge continuation time reaches the time set in this way, in a step S4, the controller 11 stops the supply of hydrogen and air to the fuel cell stack 1. Operation of other auxiliary devices of the fuel cell stack 1 is also stopped.

This routine is executed when operation of the fuel cell system stops, but may also be executed according to the temperature drop after the system stops operating. In this case, even after the fuel cell system stops operating, the controller 11 is kept in an active state. The controller 11 monitors the temperature sensor 17 after operation stops, and when the temperature of the fuel cells 2*a*, 2*b* approaches freezing point, executes the processing of the step S3.

In this case, provided that the fuel cells 2*a*, 2*b* do not fall to low temperature, purge is not performed. The purge condition may also be set based on the atmospheric temperature instead of the temperature of the fuel cells 2*a*, 2*b*.

If the moisture in the fuel cells 2*a*, 2*b* freezes, the moisture in the fuel cells 2*a*, 2*b* can no longer be purged by hydrogen or air. In any case, therefore, the routine must be executed before the temperature falls below freezing point.

In this fuel cell stack 1, the moisture absorption capacity of the end cells 2*b* was set to be larger than that of the center cells 2*a*, so even if the whole fuel cell stack 1 was uniformly dried by the routine of FIG. 3, the end cells 2*b* may absorb more moisture than the center cells 2*a* on the next startup.

Instead of leaving the fuel cells 2*a*, 2*b* after they are completely dried, it is preferred to place the fuel cells 2*a*, 2*b* in a low humidity state in preparation for the next power generation. In this case, hydrogen and air which have been humidified to a low humidity state are supplied to the fuel cell stack 1 after purge.

Next, the routine for starting up of the fuel cell stack 1 executed by the controller 11 will be described referring to FIG. 4. The controller 11 executes this routine when an operation command signal of the fuel cell system is input to the input interface.

First, in a step S11, the controller 11 reads the temperature of the fuel cell stack 1 detected by the temperature sensor 17.

In a following step S12, the controller 11 determines whether or not the temperature of the fuel cell stack 1 is higher than freezing point temperature, i.e., zero degrees Centigrade.

If the temperature of the fuel cell stack 1 is higher than freezing point temperature, the controller 11 terminates the routine without performing any further steps. In this case, the fuel cell system performs ordinary operation.

If the temperature of the fuel cell stack 1 is not higher than freezing point temperature, the controller 11, in a step S13, performs low temperature operation. Low temperature operation maintains the output current of the fuel cell stack 1 at a constant current via the constant current control circuit 8 regardless of the power required from the fuel cell stack 1, and continues operation of the fuel cell system aimed at thawing the frozen moisture in the fuel cells 2*a*, 2*b* for a fixed time.

After operation of the fuel cell system has continued for a fixed time, the controller 11 repeats the processing of the steps 11-13 until the temperature of the fuel cell stack 1 rises above freezing point temperature.

If the fuel cell system is used as a motive power source to run a vehicle, the power obtained from power generation to thaw the fuel cell stack 1 can be used to run the vehicle. Further, the extra power can be used for heating auxiliary equipment, stack itself, or charging the battery.

Next, the effect of this fuel cell system will be described referring to FIGS. 5A-5F.

Among FIGS. 5A-5F, FIGS. 5D-5F show the startup state of this fuel cell system wherein the moisture absorption capacity of the end cells 2*b* is arranged to be larger than that of the center cells 2*a*. FIGS. 5A-5C show the startup state in the prior art wherein the moisture absorption capacity of all cells is uniform. The high voltage immediately prior to operation startup in FIGS. 5B, 5C shows the open-circuit voltage.

At −20 degrees Centigrade, when the fuel cell system according to the prior art technique is started up, and some time has elapsed after the fuel cell starts generating power on startup, due to the moisture which has thawed due to the heat generated by the electrochemical reaction or the moisture produced by the electrochemical reaction, flooding may occur in the cathode of the fuel cell before the temperature of the fuel cell stack 1 shown in FIG. 5C reaches 0 degrees Centigrade. FIG. 5A shows the sharp fall in fuel cell output current and FIG. 5B shows the sharp fall in fuel cell output voltage when flooding occurs. If this situation develops, the fuel cell stops generating power while it is still in the frozen state. Flooding tends to occur more easily in the fuel cells situated at the ends of the fuel cell stack, as mentioned above.

On the other hand, in the fuel cell system according to this invention, the moisture absorption capacity of the end cell 2*b* is arranged to be larger than that of the center cells 2*a*, so the probability that the end cell 2*b* will flood until the temperature of the fuel cell stack 1 rises above freezing point, is less than that in the prior art technique. Therefore, as shown in FIGS. 5D, 5E, the output current and output voltage of the fuel cells 2*a*, 2*b* do not fall. Further, as the fuel cells 2*a*, 2*b* actively generate power when hydrogen and air are supplied, the temperature of the fuel cell stack 1 can be raised to above freezing point in a short time, as shown in FIG. 5F.

Next, a second embodiment of this invention will be described referring to FIGS. 6 and 7.

According to this embodiment, the moisture absorption capacity of the MEA 3 used by the center cell 2*a* and end cell 2*b* are made identical.

On the other hand, the drying extents of the MEA 3 of the center cell 2*a* and end cell 2*b* before the fuel cell stack 1 has fallen below freezing point, are arranged to be different, and as a result, a difference arises in the moisture absorption performance when the fuel cell stack 1 starts up.

In a fuel cell system according to this embodiment, two hydrogen supply passages 14*a*, 14*b*, and two air supply passages 15*a*, 15*b*, are provided.

The hydrogen supply passage 14*a* supplies hydrogen to the anode of the center cell 2*a* via a center manifold 16*a*. The hydrogen supply passage 14*b* supplies hydrogen to the anode of the end cell 2*b* via an end manifold 16*b*.

The air supply passage 15*a* supplies air to the cathode of the center cell 2*a* via the center manifold 16*a*. The air supply passage 15*b* supplies air to the cathode of the end cell 2*b* via the end manifold 16*b*.

The center manifold 16*a* houses a hydrogen branch tube leading to the anode of each of the cells 2*a*, and an air branch tube leading to the cathode of each of the cells 2*a*. The end manifold 16*b* houses a hydrogen branch tube leading to the anode of each of the cells 2*b*, and an air branch tube leading to the cathode of each of the cells 2*b*.

Pressure adjusting devices 14c, 14d for adjusting pressure are respectively installed in the hydrogen supply passages 14a, 14b. Pressure adjusting devices 15c, 15d for adjusting pressure are respectively installed in the hydrogen supply passages 15a, 15b.

The remaining features of the hardware construction of the fuel cell system are identical to the fuel cell system according to the first embodiment.

Figure 7:
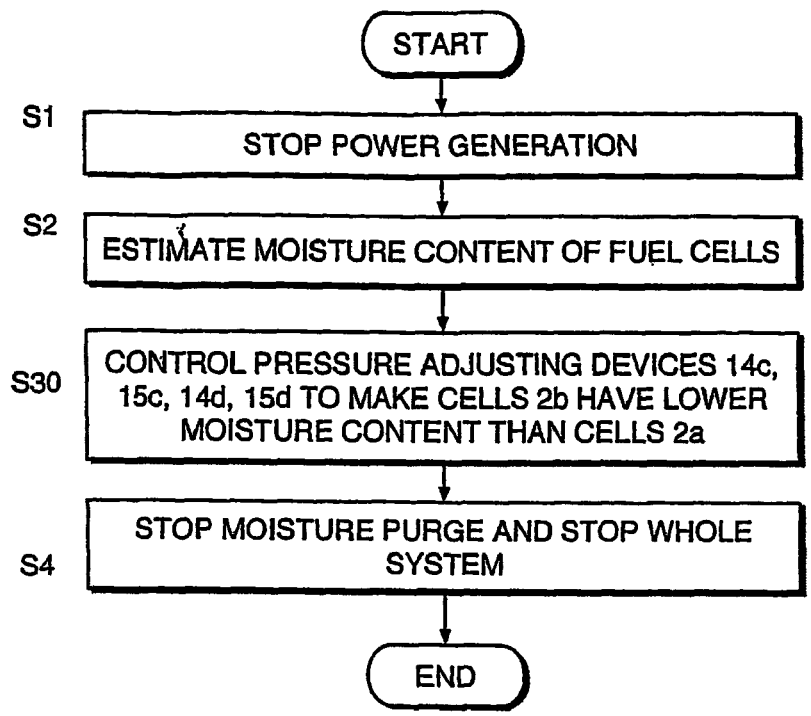
FIG. 7 is a flow chart describing a routine for stopping the fuel cell system performed by the controller according to second embodiment of this invention.

The controller 11, when the fuel cell system stops operating, executes the routine of FIG. 7 instead of the routine of FIG. 3.

In this routine, a step S30 is provided instead of the step S3 of the routine of FIG. 3.

In the step S30, the set pressure of the pressure adjusting devices 14d, 15d is set larger than the set pressure of the pressure adjusting devices 14c, 15c so that when the fuel cell system stops operating, the moisture content of the MEA 3 of the cells 2b is lower than the moisture content of the MEA 3 of the cells 2a.

Specifically, the pressure of hydrogen supplied from the hydrogen supply passage 14b to the cells 2b is arranged to be higher than the pressure of hydrogen supplied from the hydrogen supply passage 14a to the cells 2a, and the pressure of air supplied from the air supply passage 15b to the cells 2b is arranged to be higher than the pressure of air supplied from the air supply passage 15a to the cells 2a.

Instead of the pressure adjusting devices 14c, 15c, 14d, 15d, it is possible to use adjusting devices for flow rate, humidity or temperature. It is also possible to set different supply times for hydrogen and air to the cells 2a and to the cells 2b.

Concerning the hydrogen and air supplied to the cells 2b, the moisture content of the MEA 3 of the cells 2b can be arranged lower than the moisture content of the MEA 3 of the cells 2a when the fuel cell system stops operating by increasing the flowrate, decreasing the humidification, increasing the temperature or increasing the supply time.

The processing of the other steps S1, S2 and S4 is identical to the routine of FIG. 3 of the first embodiment.

Figure 4:
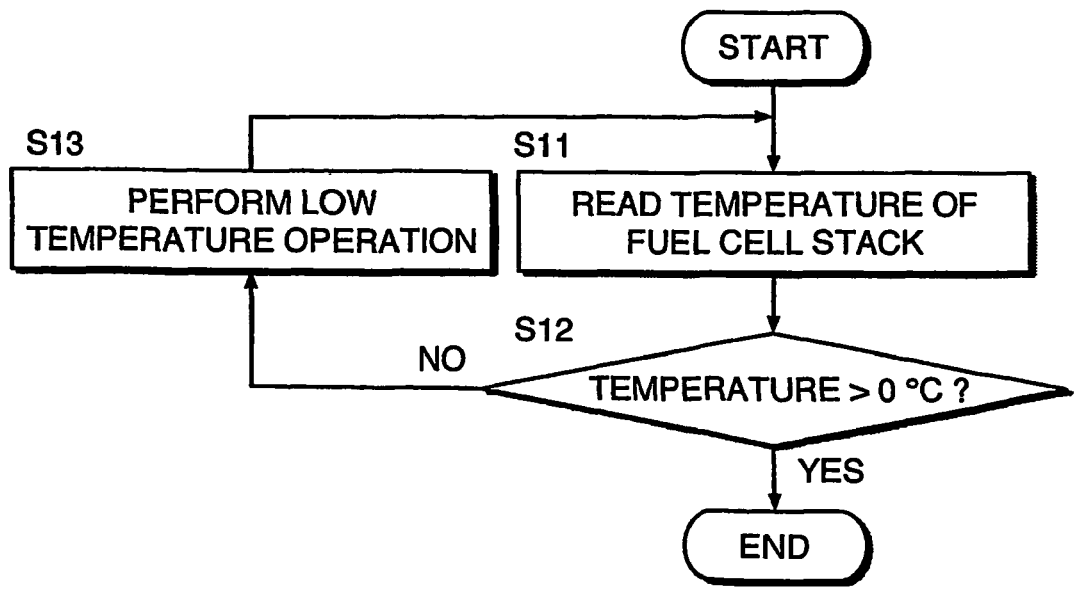
FIG. 4 is a flow chart describing a routine for starting up the fuel cell system performed by the controller according to this invention.

When the fuel cell system starts up, the controller 11 also executes the routine of FIG. 4 in an identical manner to the first embodiment.

The moisture absorption capacity of the MEA 3 depends on the moisture content when the MEA 3 starts absorbing moisture, and more moisture can be absorbed the lower is the moisture content when moisture absorption starts, i.e., the drier is the MEA 3. In this embodiment, the moisture content of the MEA 3 of the cells 2b when the fuel cell system stops operating is arranged to be lower than the moisture content of the MEA 3 of the cells 2a. As a result of this measure, when the fuel cell system starts operating again, the MEA 3 of the cells 2b can absorb more moisture. Therefore, as in the first embodiment, flooding in the fuel cells 2a, 2b when the fuel cell system starts up below freezing point can be prevented. Consequently, startup of the fuel cell system is not impeded by freezing of excess moisture due to flooding, and the startup performance of the fuel cell system can be enhanced.

According to this embodiment, the same desirable effect as that of the first embodiment regarding prevention of flooding on startup can be obtained simply by purge control without changing the specifications of the center cells 2a and end cells 2b.

In this embodiment, in addition to the difference of moisture content when operation stops, the difference in moisture absorption capacity of the first embodiment can also be incorporated.

In this embodiment, as in the first embodiment, a construction may be adopted wherein the MEA 3 used in the center cells 2a and the MEA 3 used in the end cells 2b have different moisture absorption functions.

In this embodiment, the four pressure adjusting devices 14c, 14d, 15c, 15d are provided, but it is not absolutely necessary to provide all these adjusting devices. If at least the pressure adjusting device 14d relating to supply of air to the end cells 2b is provided, the moisture content of the MEA 3 of the cells 2b can be arranged to be lower than the moisture content of the MEA 3 of the cells 2a. The pressure adjusting devices 14c, 14d correspond to the purge device in the claims.

In the aforesaid embodiments, moisture was purged using hydrogen and air in order to dry the MEA 3. However, instead of gases used in the electrochemical reaction such as hydrogen and air, moisture can be purged also by supplying a special purge gas such as for example nitrogen gas or combustion gas from the combustor 19.

Further, in the fuel cells 2a, 2b, moisture is produced by the electrochemical reaction in the cathode 26a. Therefore, purging may be performed only for the cathode 26b without purging the anode 26a.

Figure 9:
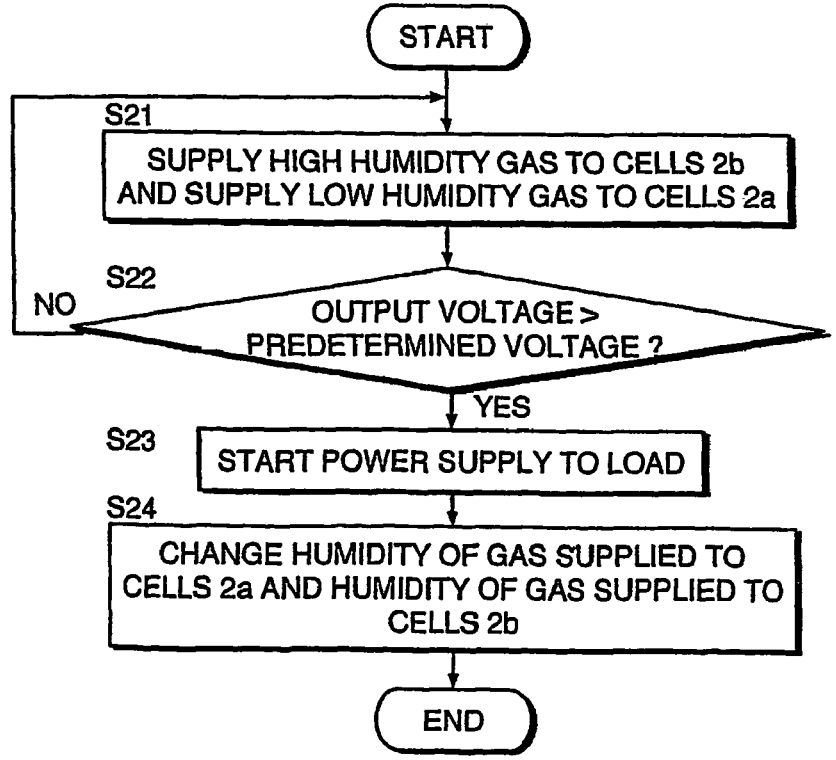
FIG. 9 is a flow chart describing a power supply start routine of the fuel cell system performed by the controller according to the third embodiment of this invention.

Next, referring to FIGS. 8-10, a third embodiment of this invention will be described.

In this embodiment, NAFION 111 having a film thickness of 30 μm is used for the solid electrolyte membrane 20 of the center cells 2a, and NAFION 112 having a film thickness of 50 μm is used for the end cells 2b. Carbon paper of thickness 200 μm is used for the gas diffusion layer 22 of the center cells 2a, and carbon paper of thickness 300 μm is used to the gas diffusion layer 22 of the end cells. Moisture repelling treatment is given to the carbon paper. To enhance the moisture removal properties of the end cells 2b, the amount of moisture repelling material in the end cells 2b is preferably arranged to be larger than that of the center cells 2a. Further, the diameter of the pores in the carbon paper used in the end cells 2b is preferably arranged to be larger than the diameter of the pores in the carbon paper used in the center cells 2a. For this purpose, instead of the carbon paper in the end cells 2b, carbon cloth could be used.

As a method of increasing the moisture absorption capacity, the contact angle between the gas diffusion layer 22 and moisture is preferably increased. Specifically, this is done by forming fine irregularities in the surface of the carbon paper forming the gas diffusion layer 22. More specifically, when the carbon paper is given a moisture-repellant treatment, the surface of the carbon paper is roughened by mixing a fluorine compound such as polytetrafluoroethylene (TEFLON®) and silicon oxide ($SiO_2$) particles.

As another method of increasing the contact angle between the gas diffusion layer 22 and moisture, the hydrophilic properties/moisture-repelling properties of the diffusion layer 22 may also be varied. In the case of TEFLON, the contact angle is 108 degrees, but poly perfluorooctylethylacrylate which has been given a higher fluorine concentration has a contact angle of 120 degrees. Whereas the fluorine in TEFLON is bonded in the form of —$CF_2$—$CF_2$—, perfluorooctylethyl acrylate has the side chains —$CF_2$—$CF(CF_3)$—, so the fluorine concentration is higher.

Figure 8:
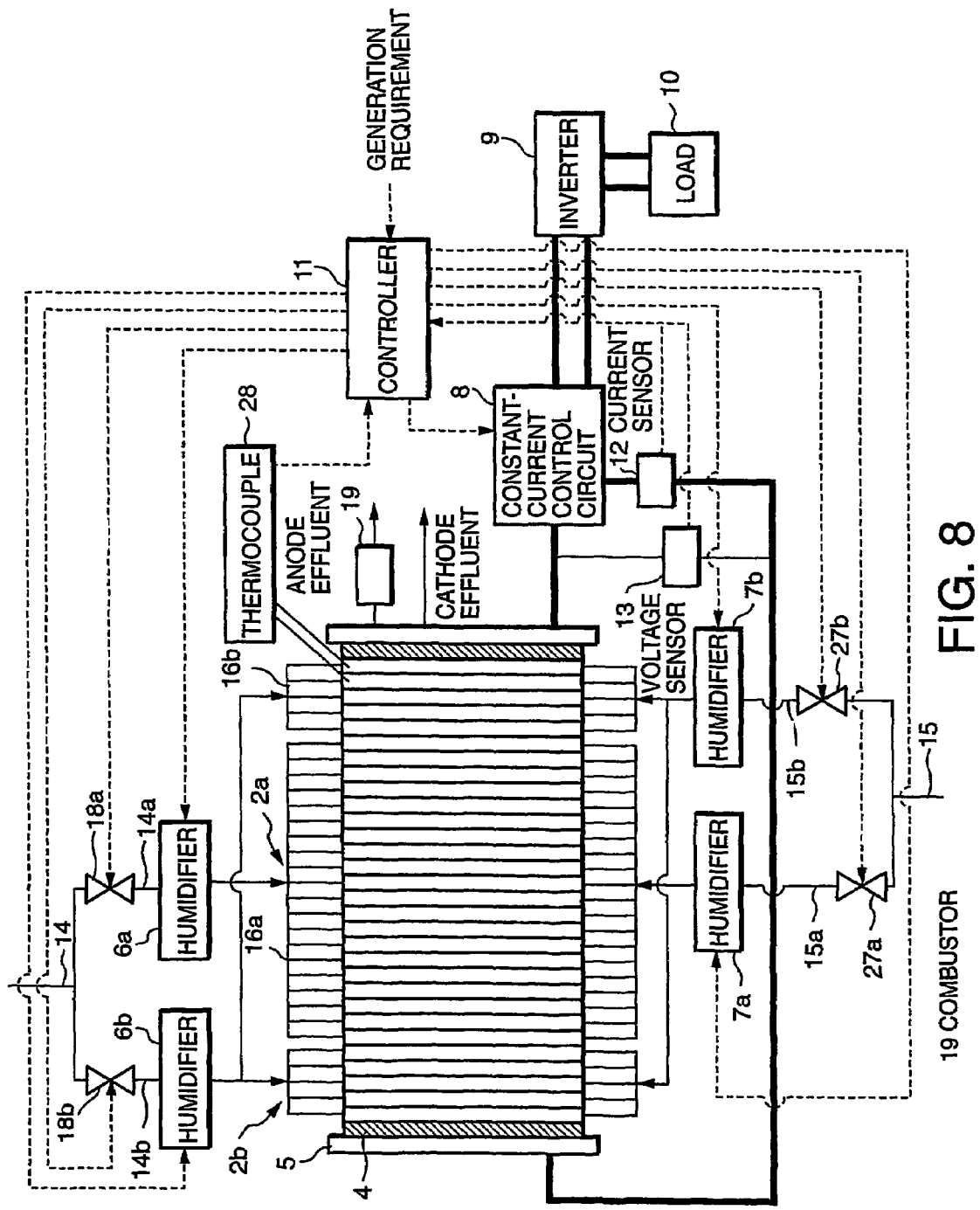
FIG. 8 is a schematic diagram of a fuel cell system according to a third embodiment of this invention.

Referring to FIG. 8, as in the second embodiment, the fuel cell system according to this embodiment supplies hydrogen and air to the fuel cell stack 1 having the aforesaid construction respectively using the two hydrogen supply passages 14a, 14b, and the two air supply passages 15a, 15b.

Hydrogen is supplied to the hydrogen supply passages 14b, 14b from a hydrogen tank.

A valve 18a and humidifier 6a are installed in the hydrogen supply passage 14a, and a valve 18b and humidifier 6b are installed in the hydrogen supply passage 14b, respectively, so that the hydrogen supply flowrate and degree of humidification of the hydrogen supply passages 14a, 14b can be separately adjusted.

A valve 27a and humidifier 7a are installed in the air supply passage 15a, and a valve 27b and humidifier 7b are installed in the air supply passage 15b, respectively, so that the air supply flowrate and degree of humidification of the air supply passages 15a, 15b can be separately adjusted.

In this embodiment, instead of the temperature sensor 17 used in the second embodiment, a thermocouple 28 is installed in one of the end cells 2b. The thermocouple 28 detects the temperature of the end cell 2b, and inputs a corresponding signal to the controller 11.

The remaining features of the construction of the fuel cell system are identical to those of the second embodiment.

In this fuel cell system, the controller 11 performs the routine of FIG. 7 when the system stops operation and performs the routine of FIG. 4 when it starts operation as in the case of the second embodiment.

Next, referring to FIG. 9, the power supply start control of this fuel cell system normal will be described. The controller 11 executes the routine shown in FIG. 9 after the completion of the startup routine of FIG. 4.

First, in a step S21, the controller 11 operates the valves 18a, 18b and humidifiers 6a, 6b to supply high humidity hydrogen to the end cells 2b, and supply low humidity hydrogen to the center cells 2a. Likewise, the controller 11 operates the valves 27a, 27b and humidifiers 7a, 7b to supply high humidity air to the end cells 2b, and supply low humidity air to the center cells 2a.

For example, if the temperature of the fuel cell system on startup is 20 degrees Centigrade there is no risk that the fuel cells 2a, 2b will freeze even if the supplied hydrogen and air are humidified. Therefore, under these conditions, hydrogen and air of 100% humidity can be supplied to the end cell 2b, while hydrogen and air having a humidity of 80% can be supplied to the center cell 2b.

In a next step S22, the output voltage of the fuel cell stack 1 detected by the voltage sensor 13 is compared with a predetermined voltage. Herein, the fuel cell stack 1 is not supplying power to the electrical load 10, so the detection value of the voltage sensor 13 corresponds to the open-circuit voltage of the fuel cell stack 1. The predetermined voltage is the rated output voltage of the fuel cell stack 1.

When the output voltage of the fuel cell stack 1 is less than the predetermined voltage, the controller 11 repeats the processing from the step S21.

When the output voltage of the fuel cell stack 1 reaches the predetermined voltage, the controller 11, in a step S23, controls the constant current control circuit 8 to start supplying power to the load 10.

In a next step S24, the controller 11 decreases the humidity of the hydrogen and air supplied to the fuel cell stack 1 so that flooding in the fuel cell stack 1 does not occur. After the processing of the step S24, the controller 11 terminates the routine, and shifts to control for steady-state operation. When the temperature in steady-state operation of the center cells 2a of the fuel cell stack 1 is 70 degrees Centigrade, as heat escapes from the end plate 5, the temperature of the end cells 2b is a value 2-3 degrees Centigrade lower than that of the center cells 2a. Consequently, during steady-state operation, if the humidity of the hydrogen and air supplied to the center cells 2a and end cells 2b is set equal to the humidity set in the step S21, there is a possibility that flooding will occur. Also, as described above, the thickness of the solid electrolyte membrane 20 is larger for the end cells 2b than for the center cells 2a, so the moisture displacement amount from the cathode 26b to the anode 26a via the solid electrolyte membrane 20 is small. In view of this characteristic, during steady-state operation, hydrogen and air humidified to 50% humidity are supplied to the center cells 2a, and hydrogen and air humidified to 20% humidity are supplied to the end cells 2b.

There is a possibility that flooding will occur even during steady-state operation of the fuel cell system. Hence, even during steady-state operation, the controller 11 performs drying of the fuel cells 2a, 2b at an interval of from several minutes to several tens of minutes by executing the routine shown in FIG. 10. The drying operation is performed separately for the center cells 2a and end cells 2b. Specifically, in the end cells 2b, the humidity of hydrogen and air is lowered, the supply flowrate is increased or the drying operation time is increased compared to the center cell 2a. In this embodiment, this procedure is performed for both the hydrogen supplied to the anode 26a and the air supplied to the cathode 26b, but as flooding occurs mainly in the cathode 26b, the drying procedure may be applied only to air.

Figure 10:
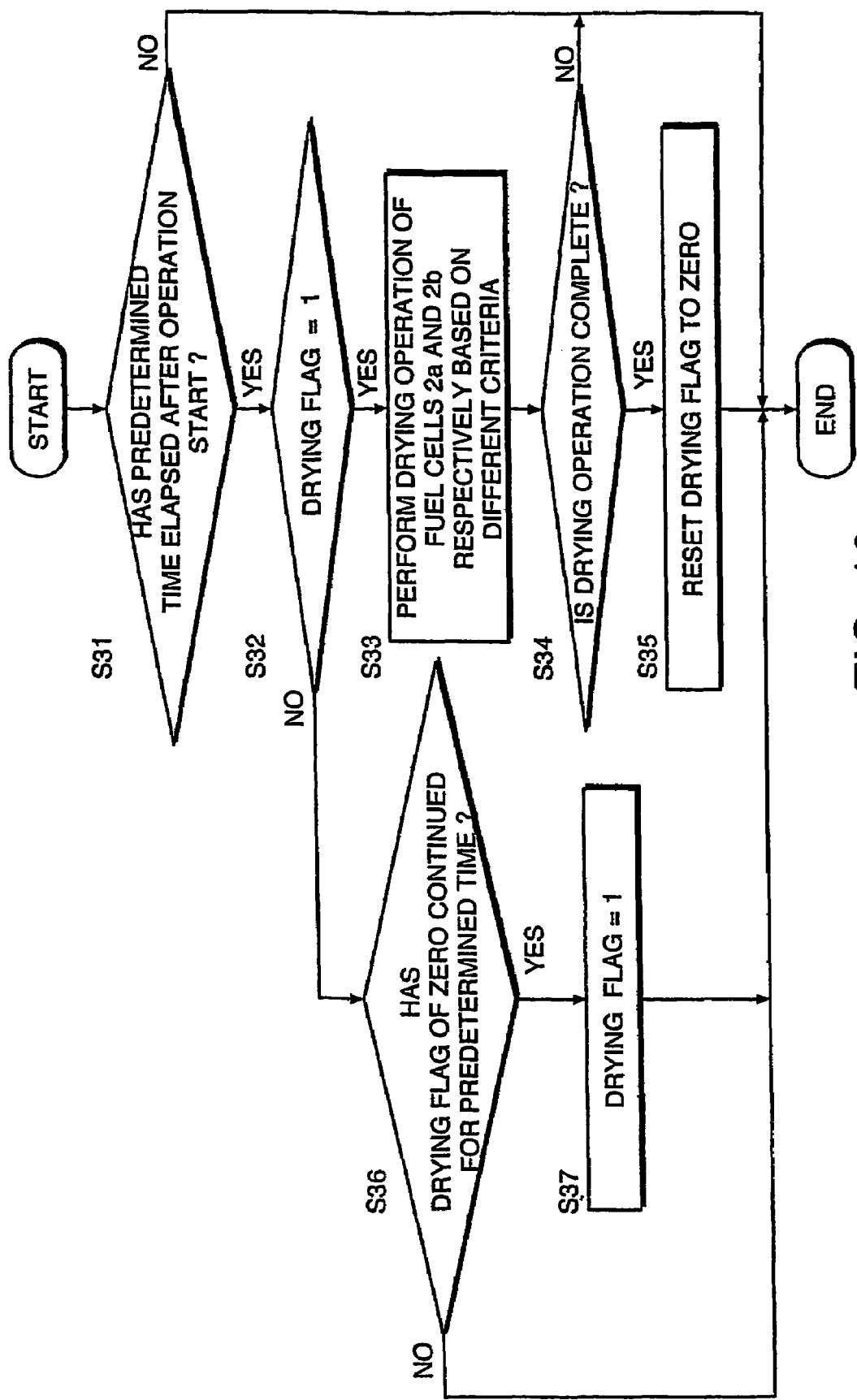
FIG. 10 is a flow chart describing a flooding prevention routine performed by the controller according to the third embodiment of this invention during steady-state operation of the fuel cell system.

The routine of FIG. 10 is executed at an interval of one hundred milliseconds during steady-state operation of the fuel cell stack 1.

Referring to FIG. 10, first in a step S31, the controller 11 determines whether or not a predetermined time has elapsed from when the fuel cell stack 1 started generating power. If the determined time has not elapsed, the routine is immediately terminated without proceeding to further steps.

If the predetermined time after power generation start has elapsed, the controller 11, in a step S32, determines whether or not a drying flag is unity. The initial value of the drying flag is zero.

When the drying flag is not unity, the controller 11, in a step S36, determines whether or not the state where the drying flag is zero has reached a predetermined time.

When the state where the drying flag is zero has reached a predetermined time, the controller 11, in a step S37, sets the drying flag to unity, and terminates the routine. When the state where the drying flag is zero has not reached the predetermined time, the controller 11 terminates the routine without performing other processing.

On the other hand, in the step S32, when the drying flag is unity, the controller 11, in a step S33, performs the drying procedure separately for the end cells 2b and the center cells 2a. Specifically, the humidification of the hydrogen and air supplied to the end cells 2b and center cells 2a is decreased by operating the humidifiers 6a, 6b and humidifiers 7a, 7b. Also, the hydrogen and air supply flowrates supplied to the end cells 2b and center cells 2a are varied by operating the valves 18a, 18b and the valves 27a, 27b. Due to this processing, both the end cells 2b and center cells 2a are dried, and due to the control difference in the procedure, the dryness of the end cells 2b is enhanced compared to that of the center cells 2a.

In a next step S34, it is determined whether or not the drying procedure is complete. This determination is made based on the drying continuation time. Alternatively, by using the method described for the routine of FIG. 3, the humidity may actually be detected, and it may be determined whether the drying procedure is complete by comparing it with a predetermined target humidity.

In the step S34, if it is determined that the drying procedure is complete, the controller 11, in a step S35, resets the drying flag to zero, and terminates the routine. If it is determined that the drying procedure is not complete, the controller 11 terminates the routine without changing the setting of the drying flag.

According to this routine, the drying procedure is performed for the first time when the predetermined time has elapsed after the fuel cell stack 1 starts operating, and when the drying procedure is complete, the drying procedure is again performed when the predetermined time has elapsed. In this way, by regularly performing the drying procedure during steady-state operation, flooding during steady-state operation can be prevented.

In this embodiment, the drying procedure is performed at a predetermined interval, but it is also possible to perform the drying procedure when the fuel cell stack 1 is not generating power as in the case when a vehicle is decelerating.

Next, a fourth embodiment of this invention will be described.

This embodiment relates to the construction of the fuel cell stack 1.

In this embodiment, the cross-sections of the passages 24, 25 formed in the separators 23 of the end cells 2b of the fuel cell stack 1, are set to be larger than the cross-sections of the passages 24, 25 formed in the separators 23 of the center cells 2a. Specifically, the cross-sections of the passages 24, 25 of the end cells 2b are set to have a width of 1 millimeter (mm) and a depth of 1 mm, whereas the cross-sections of the passages 24, 25 of the center cells 2a are set to have a width of 0.8 mm and a depth of 0.8 mm.

Figure 6:
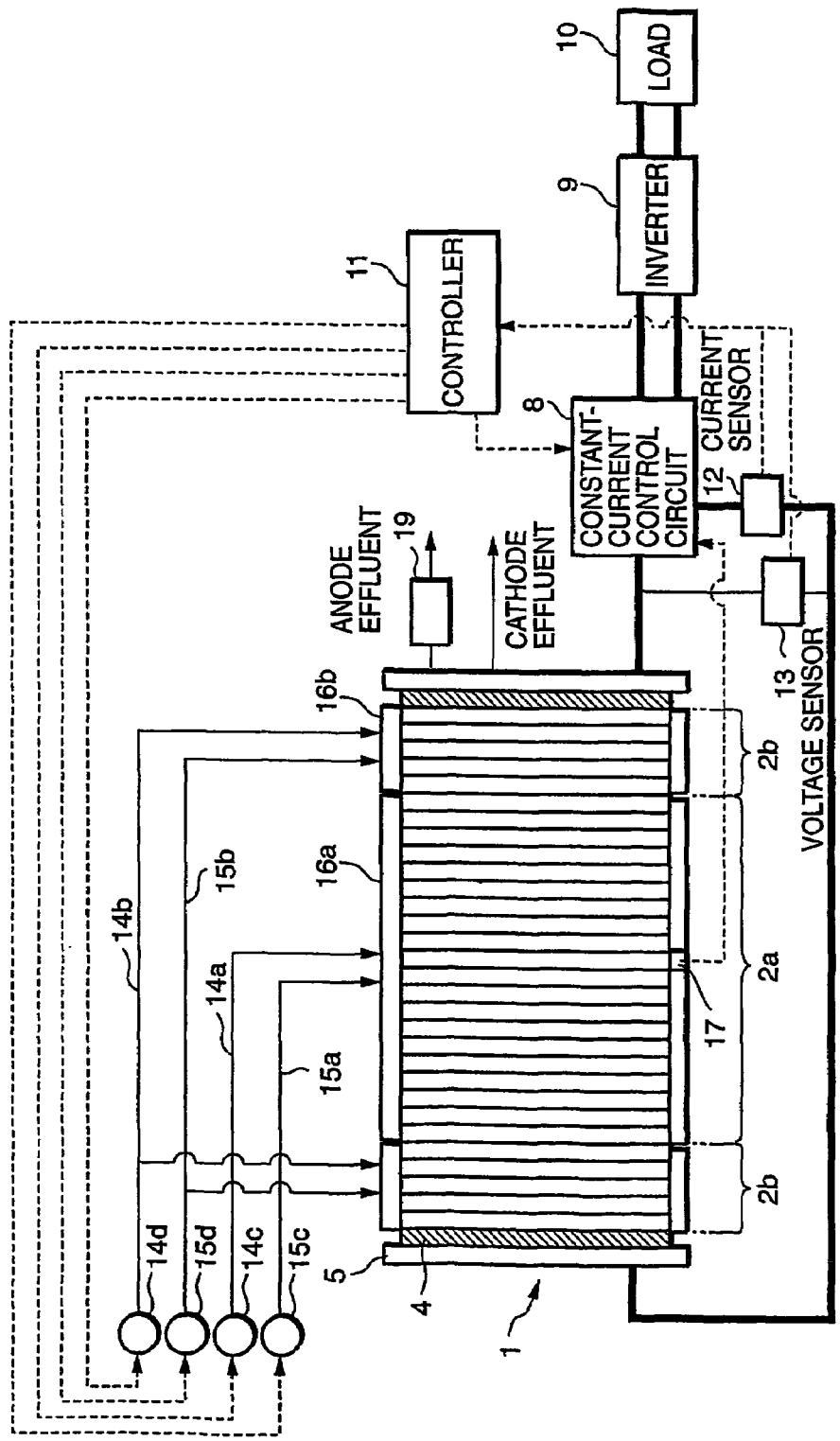
FIG. 6 is a schematic diagram of a fuel cell system according to a second embodiment of this invention.

The construction of the fuel cell system other than the fuel cell stack 1 is identical to the second embodiment shown in FIG. 6.

For example, when the fuel cell system is started in a low-temperature environment of −20 degrees centigrade, if there is ice in the passages 24, 25 of the fuel cells 2a, 2b in the fuel cell stack 1, the cells may not be able to produce an open-circuit voltage. Hence, by making the passages 24, 25 of the end cells 2b which tend to fall to low temperature, larger than those of the center cell 2a, the probability of a state in which power cannot be generated is reduced. This is considered to be due to the fact that the passage is less easily blocked by ice, the larger is the cross-section of the passage. It may be noted that if flowrate control of the hydrogen supply passages 14a, 14b and air supply passages 15a, 15b is also performed so that the hydrogen supply flowrate to the end cells 2b is larger than the hydrogen supply flowrate to the center cells 2a, and so that the air supply flowrate to the end cells 2b is larger than the air supply flowrate to the center cells 2a, an even more marked effect can be expected.

INDUSTRIAL FIELD OF APPLICATION

As described above, according to this invention, flooding of the end cells of a fuel cell stack at low temperature can be prevented. Therefore, by applying this invention to a fuel cell system for a vehicle which often starts up under low temperature, it has a desirable effect in enhancing the low-temperature start-up performance of the vehicle.

The contents of Tokugan 2003-136791, with a filing date of May 15, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

The invention claimed is:

1. A fuel cell system comprising:
a fuel cell stack comprising a plurality of fuel cells stacked in series;
wherein the fuel cells comprise a first fuel cell disposed in a center position of the fuel cell stack with respect to a stacking direction of the fuel cells, and a second fuel cell disposed in a position other than the center position with respect to the stacking direction of the fuel cells, the second fuel cell being arranged to have a larger moisture absorption capacity than the first fuel cell.

2. The fuel cell system as defined in claim 1, wherein each of the fuel cells comprises an anode to which hydrogen is supplied, a cathode to which air containing oxygen is supplied, and a electrolyte membrane formed of a moisture-absorbing material which conducts hydrogen ions from the anode to the cathode, and the electrolyte membrane of the second cell is formed to have a larger moisture absorption capacity than the electrolyte membrane of the first cell.

3. The fuel cell system as defined in claim 1, wherein each of the fuel cells comprises an anode to which hydrogen is supplied, a cathode to which air containing oxygen is supplied, and a electrolyte membrane formed of a moisture-absorbing material which conducts hydrogen ions from the anode to the cathode, and the cathode of the second cell is formed to have a larger moisture absorption capacity than the cathode of the first cell.

4. The fuel cell system as defined in claim 1, wherein the fuel cell system further comprises a humidifier which humidifies air supplied to the fuel cells and a programmable controller programmed to control the humidifier to suppress the humidification of the air supplied to the fuel cells before the fuel cell system stops operating.

5. The fuel cell system as defined in claim 4, wherein the fuel cell system further comprises a sensor which detects a parameter related to the moisture content of the fuel cells, and the controller is further programmed to determine the moisture content of the fuel cells from the parameter, and to make the humidification suppression time longer, the larger is the moisture content of the fuel cells.

6. The fuel cell system as defined in claim 4, wherein the fuel cell system further comprises a humidifier which humidifies hydrogen supplied to the fuel cells, and the controller is further programmed to control the humidifier to suppress the humidification of the hydrogen supplied to the fuel cells before the fuel cell system stops operating.

7. The fuel cell system as defined in claim 1, wherein the fuel cell system further comprises a humidifier which humidifies air supplied to the fuel cells, a sensor which detects a temperature of the fuel cell stack and a programmable controller which controls the humidifier, wherein the controller is programmed to supply air to the fuel cells while suppressing humidification of air by the humidifier, when the temperature of the fuel cell stack reaches a predetermined low temperature region after the fuel cell system stops operating.

8. The fuel cell system as defined in claim 1, wherein the fuel cell system further comprises an electrical circuit which adjusts an output current of the fuel cell stack, a sensor which detects a temperature of the fuel cell stack and a programmable controller programmed to control the electrical circuit to maintain the output current of the fuel cell stack at a constant current when the temperature of the fuel cell stack is in a predetermined low temperature region when the fuel cell system starts up.

9. The fuel cell system as defined in claim 1, wherein the fuel cell system further comprises a purge device which purges residual moisture in the second cell, a sensor which detects a temperature of the fuel cell stack and a programmable controller programmed to operate the purge device so that the moisture content of the second cell is less than the moisture content of the first cell when the temperature of the fuel cell stack is in a predetermined low temperature region.

10. The fuel cell system as defined in claim 9, wherein the purge device is a device which adjusts one of a pressure, a flowrate, a humidification degree, a temperature and a supply time of the air supply to the second cell.

11. The fuel cell system as defined in claim 1, wherein the fuel cell system further comprises a first humidifier which humidifies air supplied to the first cell, a second humidifier which humidifies air supplied to the second cell, a sensor which detects a temperature of the fuel cell stack and a programmable controller programmed to control the first humidifier and second humidifier so that the humidity of the air supplied to the second cell is higher than the humidity of the air supplied to the first cell when the temperature of the fuel cell stack is equal to or higher than a predetermined temperature when the fuel cell system starts up.

12. The fuel cell system as defined in claim 1, wherein the fuel cell system further comprises a first humidifier which humidifies air supplied to the first cell, a second humidifier which humidifies air supplied to the second cell, a voltage sensor which detects an output voltage of the fuel cell stack and a programmable controller programmed to control the first humidifier and second humidifier so that the humidity of the air supplied to the first cell is higher than the humidity of the air supplied to the second cell when the output voltage of the fuel cell stack is equal to or greater than a predetermined voltage.

13. The fuel cell system as defined in claim 1, wherein the fuel cell system further comprises a first humidifier which humidifies air supplied to the first cell, a second humidifier which humidifies air supplied to the second cell and a programmable controller programmed to control the first humidifier and second humidifier to decrease the humidity of the air supplied to both the first cell and second cell at a predetermined interval in a state where the humidity of the air supplied to the second cell is lower than the humidity of the air supplied to the first cell.

14. A fuel cell stack generating electric power through electrochemical reaction of hydrogen and oxygen, comprising:

a plurality of fuel cells stacked in series, each of the fuel cells comprising an anode to which hydrogen is supplied, a cathode to which air containing oxygen is supplied, and an electrolyte membrane which conducts hydrogen ions from the anode to the cathode;

wherein the fuel cells comprise a first cell disposed in a center position of the fuel cell stack with respect to a stacking direction of the fuel cells, and a second cell disposed in a position other than the center position, the second cell being arranged to have a larger moisture absorption capacity than the first cell.

15. The fuel cell stack as defined in claim 14, wherein the electrolyte membrane comprises a moisture-absorbing material, and the electrolyte membrane of the second cell has a larger thickness in the stacking direction than the electrolyte membrane of the first cell.

16. The fuel cell stack as defined in claim 14, wherein the electrolyte membrane comprises a moisture-absorbing material, and the electrolyte membrane of the second cell has a larger ion exchange group equivalent weight than the electrolyte membrane of the first cell.

17. The fuel cell stack as defined in claim 14, wherein the second cell comprises a substrate material, and a moisture-absorbing material mixed with the substrate material.

18. The fuel cell stack as defined in claim 17, wherein the moisture-absorbing material is a material selected from a group comprising hygroscopic inorganic porous particle moisture-absorbing resins comprising silica gel, synthetic zeolite, alumina gel, titania gel, zirconia gel, yttria gel, tin oxide and tungsten oxide.

19. The fuel cell stack as defined in claim 17, wherein the moisture-absorbing material is a material selected from a group comprising a crosslinked polyacrylate, starch-acrylate graft copolymer cross-linked material, Poval polymer resin, polyacrylonitrile polymer resin and carboxymethylcellulose polymer resin.

20. The fuel cell stack as defined in claim 17, wherein the substrate material is the electrolyte membrane of the second cell, and the moisture-absorbing material is mixed with the electrolyte membrane within a weight range of 0.01% to 30% relative to a weight of the electrolyte membrane.

21. The fuel cell stack as defined in claim 17, wherein the cathode comprises a catalyst layer in contact with the electrolyte membrane and a cathode gas diffusion layer which diffuses oxygen in the air into the catalyst layer, the substrate material is the cathode gas diffusion layer of the second cell, and the moisture-absorbing material is mixed with the cathode gas diffusion layer within a weight range of 0.01% to 30% relative to a weight of the cathode gas diffusion layer of the second cell.

22. The fuel cell stack as defined in claim 14, wherein the cathode comprises a catalyst layer in contact with the electrolyte membrane and a cathode gas diffusion layer formed of a moisture-adsorbing material which diffuses oxygen in the air into the catalyst layer, and the cathode gas diffusion layer of the second cell has a larger thickness in the stacking direction than the cathode gas diffusion layer of the first cell.

23. The fuel cell stack as defined in claim 14, wherein the cathode comprises a catalyst layer in contact with the electrolyte membrane and a cathode gas diffusion layer formed of a moisture-adsorbing material which diffuses oxygen in the air into the catalyst layer, and the cathode gas diffusion layer of the second cell has a larger specific surface than the cathode gas diffusion layer of the first cell.

24. The fuel cell stack as defined in claim 14, wherein the anode, the cathode and the electrolyte membrane are formed of a one-piece membrane electrode assembly coated with a polymer solution, and the membrane electrode assembly of the second cell has a larger polymer solution coating amount than the membrane electrode assembly of the first cell.

25. The fuel cell stack as defined in claim 24, wherein the polymer solution contains a perfluorocarbon sulfonic acid.

26. The fuel cell stack as defined in claim 14, wherein the cathode comprises a catalyst layer in contact with the electrolyte membrane and a cathode gas diffusion layer with numerous pores which diffuse oxygen in the air into the catalyst layer, and the pores of the cathode gas diffusion layer of the second cell have a larger diameter than the pores of the cathode gas diffusion layer of the first cell.

27. The fuel cell stack as defined in claim 14, wherein the cathode comprises a catalyst layer in contact with the electrolyte membrane and a cathode gas diffusion layer which diffuses oxygen in the air into the catalyst layer, and the cathode gas diffusion layer of the second cell is formed of a material having a larger contact angle with moisture than the cathode gas diffusion layer of the first cell.

28. The fuel cell stack as defined in claim 14, wherein the cathode comprises a catalyst layer in contact with the electrolyte membrane and a cathode gas diffusion layer which diffuses oxygen in the air into the catalyst layer, the cathode gas diffusion layer comprising carbon paper coated with moisture repelling material, and the carbon paper of the cathode gas diffusion layer of the second cell has a larger amount of moisture repelling material than the carbon paper of the cathode gas diffusion layer of the first cell.

29. The fuel cell stack as defined in claim 14, wherein the fuel cell stack comprises plural end cells which have a progressively increasing moisture-absorbing capacity with increasing distance from the center cell.

30. The fuel cell stack as defined in claim 14, wherein the cathode comprises a catalyst layer in contact with the electrolyte membrane, and the catalyst layer of the second cell has a larger thickness in the stacking direction than the catalyst layer of the first cell.

31. The fuel cell stack as defined in claim 14, wherein the cathode comprises a catalyst layer in contact with the electrolyte membrane, and the catalyst layer of the second cell has a larger specific surface than the catalyst layer of the first cell.

32. A fuel cell stack which generates power by an electrochemical reaction between hydrogen and oxygen, comprising:
   a plurality of fuel cells stacked in series, each of the fuel cells comprising an electrode and a gas passage facing the electrode;
   wherein the fuel cells comprise a first cell disposed in a center position of the fuel cell stack in the stacking direction of the fuel cells, and a second cell disposed in a position other than the first cell with respect to the stacking direction of the fuel cells, and the gas passage of the second cell has a larger cross-sectional area than the gas passage of the first cell.

33. The fuel cell stack as defined in claim 32, wherein a gas supply flowrate to the gas passage of the second cell is set to be larger than a gas supply flowrate to the gas passage of the first cell.

* * * * *